United States Patent [19]

Hennel

[11] 3,709,185
[45] Jan. 9, 1973

[54] AMPHIBIOUS MOTOR BIKE

[76] Inventor: Anthony Hennel, 645 Eldorado, Apt. 109, Oakland, Calif. 94611

[22] Filed: Aug. 19, 1971

[21] Appl. No.: 173,179

[52] U.S. Cl. .................. 115/0.5, 114/162, 115/23, 115/49, 416/173
[51] Int. Cl. ..................... B63h 1/04, B63h 19/00
[58] Field of Search ......... 115/0.5 A, 2, 22, 25, 27, 1, 115/26, 23, 49; 9/1 T; 114/0.5 F, 162, 66.5 F, 61; 280/169; 416/173

[56] References Cited

UNITED STATES PATENTS

| 3,215,114 | 11/1965 | Jenkins | 115/1 |
| 3,011,184 | 12/1961 | Curcio | 115/0.5 |
| 1,795,976 | 3/1931 | Straussler | 114/66.5 |

Primary Examiner—Milton Buchler
Assistant Examiner—Jerome Danoff
Attorney—William R. Piper

[57] ABSTRACT

An amphibious motor bike in which collapsible pontoons may be inflated and removably secured to the sides of the motor bike for supporting it on a body of water and at a position where the water level will be not higher than the lower one-third portion of the rear wheel. The pontoons are sectionalized and can be removed from the motor bike sides and deflated and collapsed like an accordion and then mounted in carriers arranged at the sides of the motor bike. A linear and flexible water paddle has articulated sections which permit it to be removably mounted on the rear tire of the motor bike so as to be rotated thereby and thus propel the motor bike over the body of water. A rudder can be moved from inoperative into operative position and it will be actuated by the operator manipulating the handle bars for steering the vehicle over the water.

5 Claims, 11 Drawing Figures

INVENTOR.
ANTHONY HENNEL
BY
William R. Piper
ATTORNEY

INVENTOR.
ANTHONY HENNEL
BY
William R. Piper
ATTORNEY

PATENTED JAN 9 1973
3,709,185
SHEET 3 OF 3
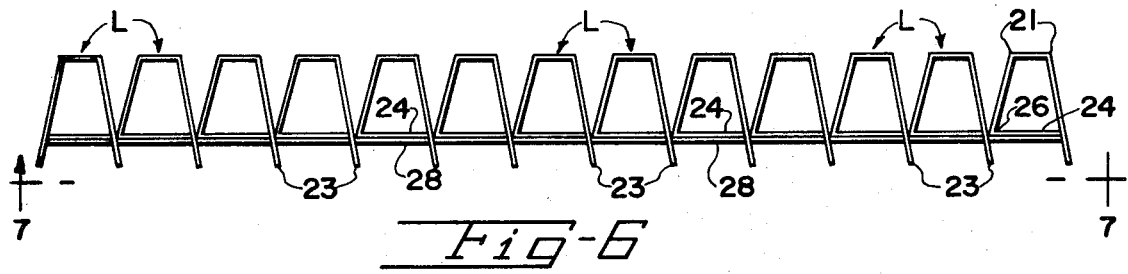
*Fig-6*
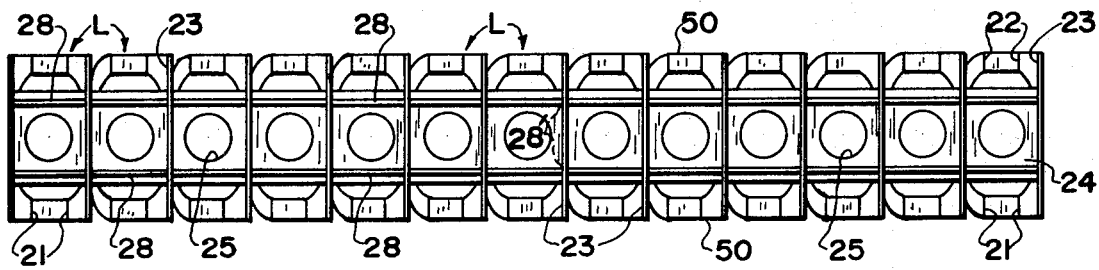
*Fig-7*
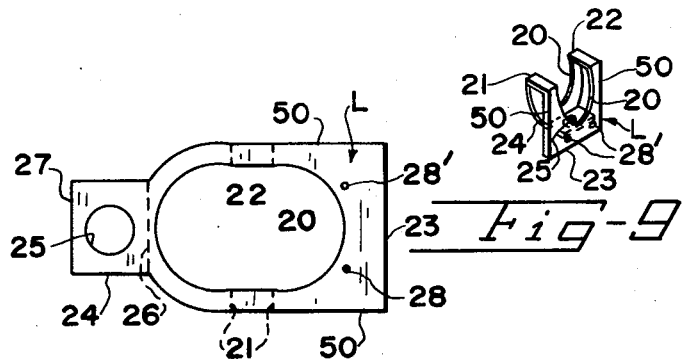
*Fig-8*
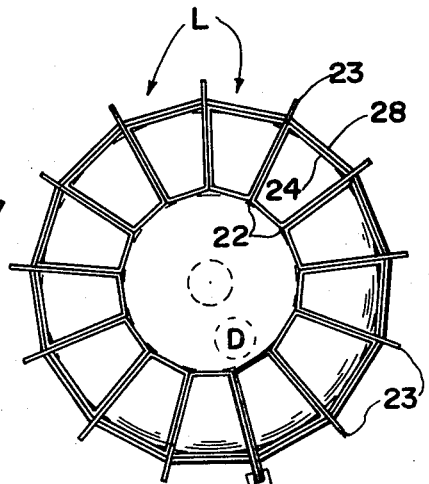
*Fig-10*
*Fig-9*
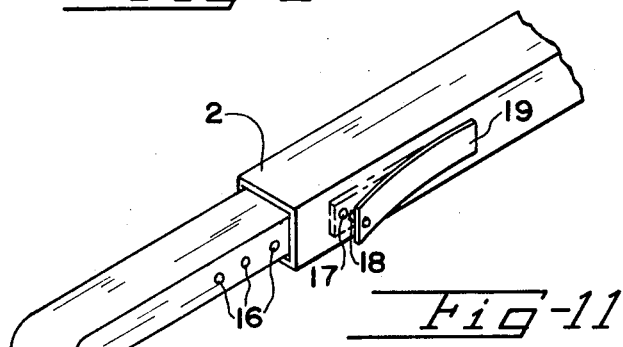
*Fig-11*
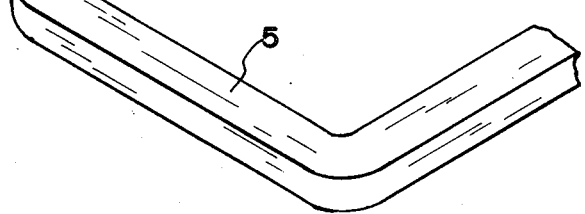
INVENTOR.
ANTHONY HENNEL
BY William R. Piper
ATTORNEY

AMPHIBIOUS MOTOR BIKE

BACKGROUND OF THE INVENTION

1. Field of the Invention

It is desirable to have an inexpensive vehicle that can be used for traveling on land or water. It is also desirable to construct the water-buoyant supporting means for the vehicle so that it can be quickly altered from a stored or inoperative position where it is carried by the vehicle when the vehicle is used for traveling on land, into an operative position where it will support the vehicle as it travels over the water. A rudder for the vehicle is movable from an inoperative position into an operative one and a linear and flexible water paddle is removably secured to the rear wheel of the vehicle when the vehicle is to be used on the water.

2. Description of the Prior Art

The patent to Van Achilles Caneghem, U.S. Pat. No. 2,075,785, is for a motorcycle in which a covering fits over the front wheel like an inverted trough and can be expended for buoyantly supporting the front of the vehicle on the water. Also, a rear covering fits over the rear wheel and it can also be expanded laterally for supporting the rear of the vehicle. A propeller is used when the vehicle is to be propelled over a body of water, but no rudder seems to be disclosed for steering the vehicle while on the water. The front covering, when expanded to buoyantly support the front of the device, is so wide as to be of little use for steering purposes.

The patent to Ruggero D'Arena, U.S. Pat. No. 3,359,937, discloses an amphibious motor scooter that makes use of two flotation tanks, one being hingedly mounted on each side of the vehicle. Each flotation tank has a central recess on its outer surface which apparently is for the purpose of receiving the operator's legs when the device is being used on land. However, FIG. 3 of the patent shows the two hinged flotation tanks swung outwardly into a position where their outer surfaces will both lie in a common plane that is horizontal. Such a position of the flotation tanks will require the operator to spread each leg laterally (an almost impossible position) or to extend his legs straight forward which is also an awkward position to assume.

SUMMARY OF THE INVENTION

An object of my invention is to provide a flotation attachment for a motor bike that will support the vehicle on a body of water. This flotation attachment basically consists of three parts; namely, (1.) a pair of detachable and collapsible pontoons that will support the motor bike on a body of water when they are in operative position and inflated with air; (2.) a linear and flexible water paddle that can be removably attached to the rear tire of the vehicle so as to constitute a paddle wheel for moving the vehicle over the water when the rear wheel is rotated; and (3.) a rudder that can be moved from an inoperative position into an operative one where it can be controlled by steering the handlebars of the vehicle. The two pontoons are formed in sections that can be folded in an accordion-like manner when the air has been released from them. All parts of the flotation attachment can be stored on the motor bike in out-of-the-way positions so as not to interfere with the use of the vehicle on land.

BRIEF DESCRIPTION OF THE DRAWING

FIG. 6 is a side elevation of the stretched out linear and flexible water paddle shown prior to being mounted on the vehicle wheel.

FIG. 7 is a bottom plan view of FIG. 6 when looking in the direction of the arrows in that Figure.

FIG. 8 illustrates a blank on one of the paddle sections that is used in making the linear and flexible water paddle with articulated sections.

FIG. 9 is a perspective view of one of the sections that make up the linear and flexible water paddle.

FIG. 10 illustrates the linear and flexible water paddle formed into a circle, the position it assumes when extended around the rear vehicle wheel.

FIG. 11 is an enlarged showing of the dot-dash circled portion 11 of FIG. 3 and illustrates a part of the attaching means used to connect the pontoon to the vehicle.

DESCRIPTION OF THE PREFERRED EMBODIMENT

Figure 1:
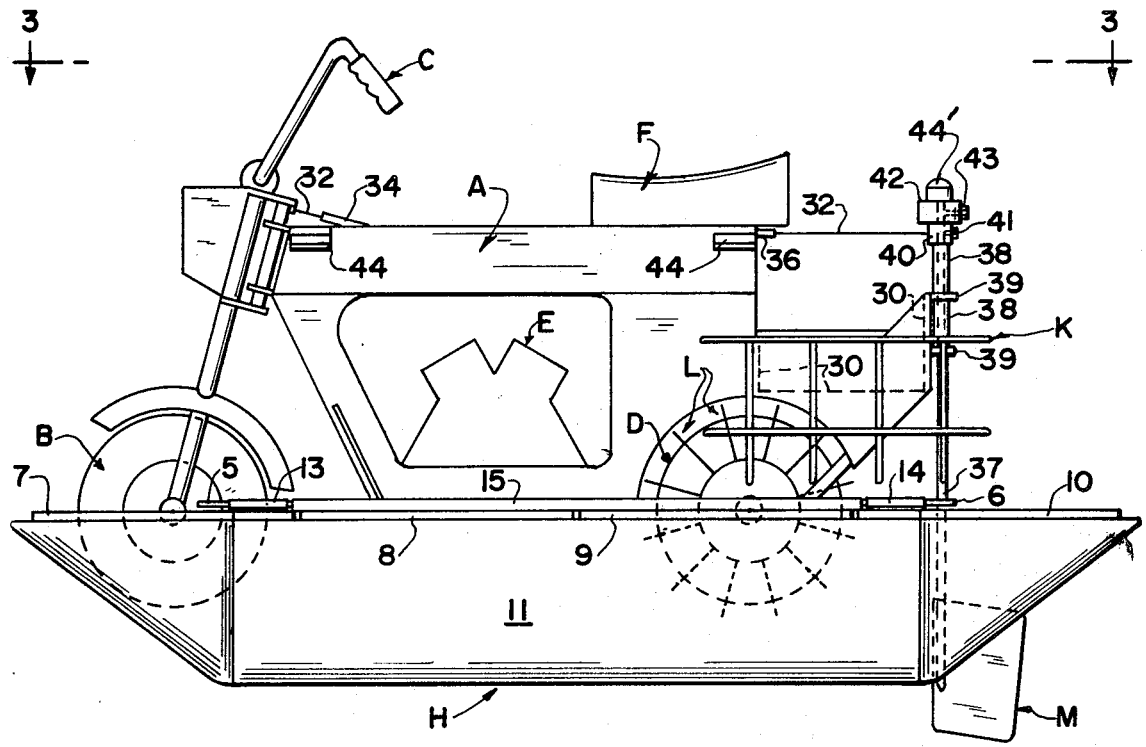
FIG. 1 is a side elevation of the amphibious motor bike and illustrates the flotation attachments for the vehicle in operative position, the linear and flexible water paddle attached to the rear vehicle wheel, and the rudder in operative position and connected to the handlebars of the vehicle so as to be steered thereby.
Figure 2:
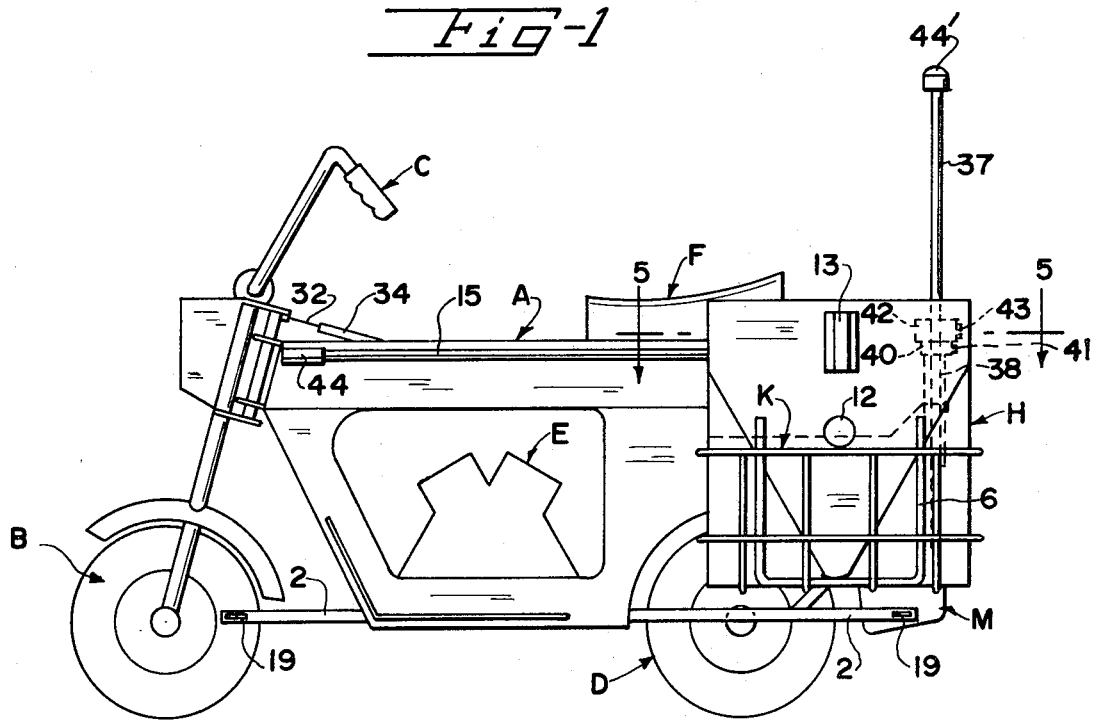
FIG. 2 is a side elevation similar to FIG. 1, but shows the flotation attachments in inoperative position and mounted in out-of-the-way positions on the vehicle so that it can be used in a normal manner for traveling on land.
Figure 3:
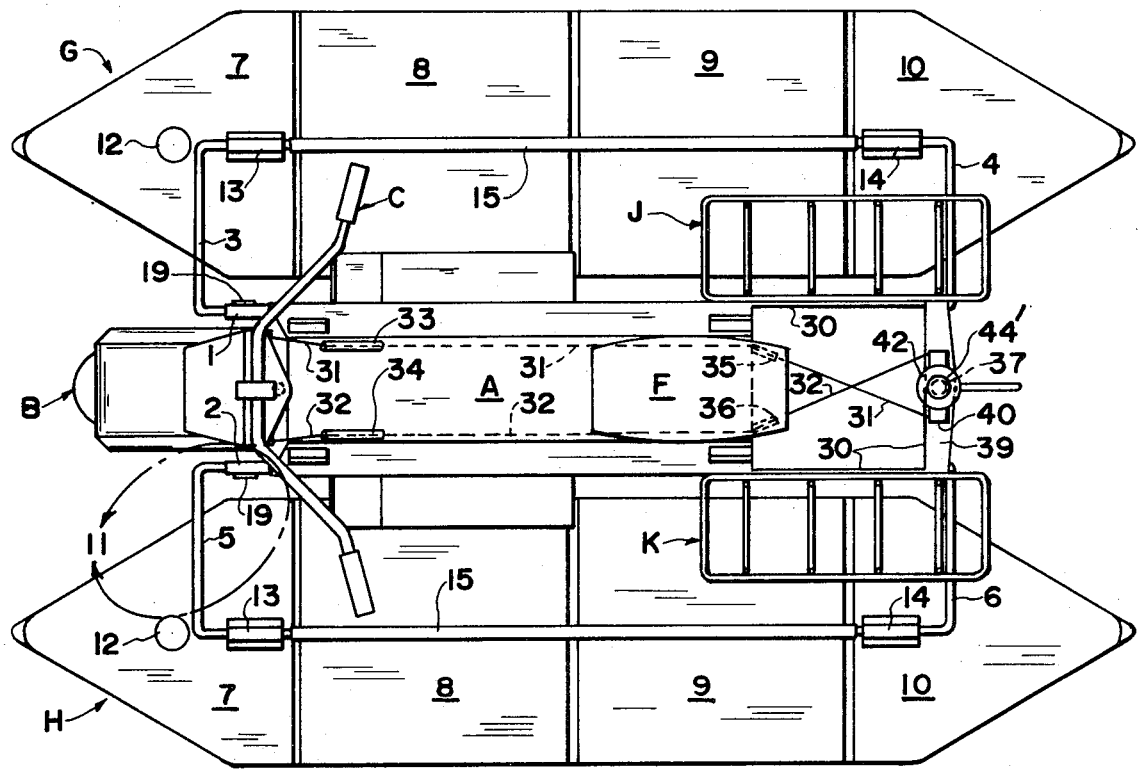
FIG. 3 is a top plan view of FIG. 1 when looking in the direction of the arrows 3—3 in that Figure.

In carrying out my invention, I make use of a motor bike of any standard construction and indicated generally at A in FIGS. 1, 2 and 3. The motor bike has the customary front wheel B, handlebars C operatively connected to the front wheel for steering purposes, a rear wheel D, a motor E for driving the rear wheel by a mechanism, not shown, and a seat F. Along each side of the vehicle I mount non-circular hollow tubing members 1 and 2, see FIGS. 2 and 3, and these members removably receive pairs of U-shaped members 3 and 4, and 5 and 6, which are also non-circular in cross section. The purpose of the U-shaped members 3 to 6 inclusive is to connect two pontoons G and H to the sides of the vehicle.

Each pontoon G and H is of indentical construction and I will describe the pontoon H in detail and like letters and reference numerals will be applied to similar parts on both pontoons. This detailed description of the pontoon H will be given before setting forth how the pontoons are connected to the sides of the vehicle for supporting it on the water. In FIGS. 1 and 3, the pontoon H is shown inflated, while in FIG. 4 it is shown deflated and partially collapsed, and in FIGS. 2 and 5 it is shown entirely collapsed in an accordion-like manner. The pontoon H, when inflated, resembles the shape of the hull of a boat, although it may be any shape desired.

The top of the pontoon H, shown in FIG. 3, is in four rigid sections 7, 8, 9 and 10, each being spaced a slight distance away from the adjacent section. The front section 7 is wedge-shaped like the prow of a boat hull. The two middle sections 8 and 9 are each rectangular in shape, while the rear section 10 is also wedge-shaped. An inflatable member 11 is cemented or otherwise secured to the undersurfaces of the rigid sections 7, 8, 9 and 10, and is made of a flexible waterproof material. FIGS. 1 and 3 show that the inflatable member 11, when fully inflated, becomes buoyant and is in the shape of a boat hull. The forward rigid section 7 has an air valve 12, indicated generally by a circle. Air under pressure can be forced through the valve and into the interior of the member 11 for inflating it. When it is desired to deflate the member 11 prior to collapsing it, the air valve 12 is opened for permitting the air to escape. For a safety feature each pontoon could have multiple chambers which would require a separate air valve for each chamber.

Figure 4:
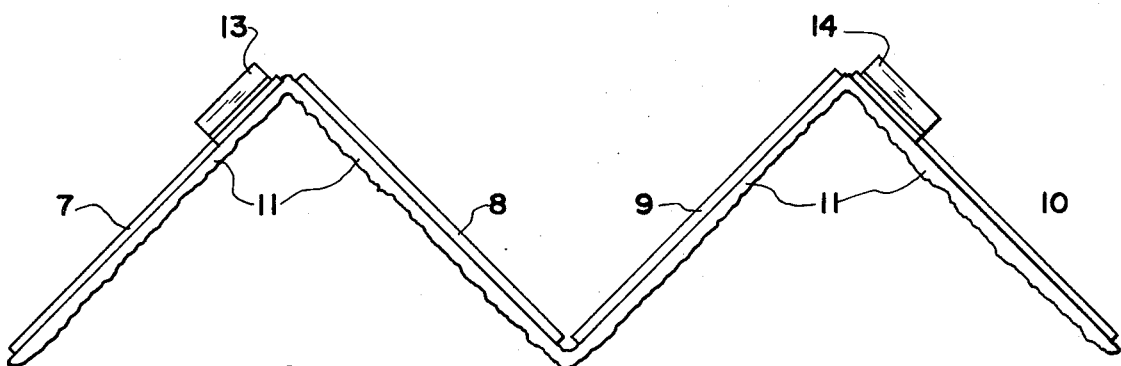
FIG. 4 is an enlarged side elevation of one of the detached pontoons in a partially collapsed or folded position preparatory to being stored in one of the side carriers of the vehicle.
Figure 5:
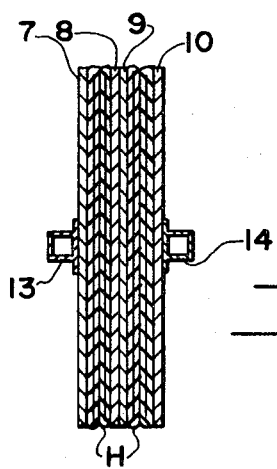
FIG. 5 is a section through the accordion-like collapsed deflated pontoon shown on the same scale as FIG. 4 and is taken along the line 5—5 of FIG. 2.

FIG. 4 shows the inflatable member or envelope 11 entirely collapsed and also illustrates the partial folding of the rigid members 7, 8, 9 and 10 in a partially folded condition. When the accordian folded members 7 to 10 inclusive are completely collapsed, they will be in a juxtaposed parallel relation, as clearly shown in the sectional view of FIG. 5. The motor bike A is provided with two carriers J and K for holding the collapsed and accordion folded pontoons G and H, see FIGS. 1, 2 and 3. The two carriers J and K are shown made out of wire although they may be constructed of any desired material. FIG. 2 illustrates the collapsed pontoon H received in the carrier K and this carrier also holds the U-shaped members 5 and 6 (only the member 6 is illustrated in FIG. 2).

It is best now to continue with the detailed description of how the pontoons G and H are removably connected to the sides of the motor bike. FIG. 3 shows the rigid front members 7 of both pontoons provided with sleeves 13 that are non-circular in cross section and the free ends of the U-shaped members 3 and 5 extend entirely through these sleeves. In like manner the rear rigid member 10 of both pontoons G and H is provided with sleeves 14 that are non-circular in cross section and the free ends of the U-shaped members 4 and 6 extend entirely through these sleeves. An elongated spacing tubular member 15, non-circular in cross section, is provided for each pontoon G and H and FIG. 3 shows one of the tubular members 15 overlying the rigid sections 8 and 9 of the pontoon G and receiving the free ends of the U-shaped members 3 and 4 that project entirely through the sleeves 13 and 14 of that pontoon. Likewise the other tubular member 15 overlies the rigid sections 8 and 9 of the pontoon H and its ends receive the free ends of the U-shaped members 5 and 6. These elongated tubular members add rigidity to the members 8 and 9 of both pontoons G and H when they are in an inflated condition and support the motor bike on the water.

The U-shaped members 3, 4, 5 and 6 are held in adjusted position in their respective hollow, non-circular tubings 1 and 2 by any means, such as by a spring-biased pin, see FIGS. 2, 3 and 11. An isometric enlargement of the front end of the non-circular hollow tube 2 is illustrated in FIG. 11 and a portion of the U-shaped member 5 is also shown. The leg of the U-shaped member 5 that telescopes within the adjacent end of the tube 2 is provided with a row of openings 16 and the adjacent end of the tubular member 2 has an opening 17 that is adapted to register with any one of the openings 16. A spring biased pin 18 is carried by a leaf spring 19 that has one end welded to the tube 2. The tendency of the left spring 19 is to move from the full line curved or flexed position shown in FIG. 11, into the dash line position where the leaf spring is flat and its locking pin 18 will be received in the opening 17 and will extend on into the registering opening 16 in the U-shaped member 5. In this manner the U-shaped member 5 is held against movement in the tube 2 until the free end of the leaf spring 19 is manually flexed to free the pin 18 from the opening 16 and permit the U-shaped member 5 to be removed. In the same way the U-shaped members 3, 4 and 6 are removably secured in the tubular members 1 and 2.

The purpose of making the hollow tubing 1 and 2 non-circular in cross section and of making the U-shaped members 3, 4, 5 and 6 also non-circular in cross section is to prevent the U-shaped members from swinging radially about the tubings 1 and 2 as an axial center. This structure will maintain the planes of the U-shaped members 3, 4, 5 and 6 in a common horizontal plane. Therefore the inflated pontoons cannot move vertically with respect to the motor bike A. The leaf springs 19 with their locking pins 18 will prevent the pontoons G and H from accidentally freeing themselves from the tubular members 1 and 2.

I will now describe the linear and flexible water paddle with the articulated sections or links that can be mounted on the rear motor bike wheel D for encircling the wheel and producing a paddle wheel arrangement for the vehicle. FIGS. 6 to 10 inclusive illustrate the device. A blank for one of the sections is shown in FIG. 8 and this blank or link, when bent along certain fold lines, is formed into one of the sections as shown in perspective in FIG. 9. The blank L, see FIG. 8, can be made out of any material desired, such as metal or plastic. The blank L has an oval-shaped opening 20 with two pairs of fold lines indicated by the dash lines 21 and 22, these lines paralleling the outer edge 23 of the blank. The blank L has a tongue-shaped portion 24 provided with an opening 25 and a fold line 26 is indicated by dash lines.

The blank L is bent along the fold lines 21, 22 and 26 of FIG. 8 to form one of the water paddle sections L, shown in perspective in FIG. 9. The tongue portion 24 has its outer edge 27 welded or otherwise secured to the inner face of the blank and at a spaced distance from the edge 23. A plurality of the water paddle sections L are connected together by spaced apart and parallel cables 28, see FIGS. 6 and 7. The cables are welded or otherwise secured to the undersurfaces of the tongue portions 24 of the adjacent sections L. The cables 28 are flexible and this will permit the paddle wheel sections or links L to be formed into a circle, as shown at FIG. 10, and to encircle the rear wheel D of the vehicle as indicated by the dash line circle in this Figure and also illustrated in FIG. 1, where the paddle sections L are on such a small scale that they are shown by single lines. The two outermost sections L, when brought into contact with each other, can be secured together by any desired means, such as by a clip 29, see FIG. 10, that is slipped over the abutting outer edges 29. Bolts, not shown, or any other fastening means, could be used instead of the clip 29, if desired. The oval opening 20 receives the tire and the sides of the links grip the tire. When the linear and flexible water paddle with the articulated sections is not mounted on the rear wheel D, then it can be carried in a compartment 30, provided at the rear of the vehicle A, see FIGS. 1 and 3.

The steering mechanism for the device, when it is supported on the water by the inflated pontoons G and H, is illustrated in FIGS. 1, 2 and 3. A pair of cables 31 and 32, see FIG. 3, have their forward ends connected to the handlebars C of the vehicle, these handlebars being used to steer the front wheel B of the vehicle. The two cables 31 and 32 are then slidably received in a front pair of tubular cable guides 33 and 34 and also extend through a rear pair of tubular cable guides 35 and 36 that are inclined with respect to each other. A vertically extending rudder rod 37 is adjustably received in a vertical bearing 38 that is carried by a pair of rearwardly extending flanges 39, mounted at the rear of the vehicle A, see FIG. 1. The bearing extends above the uppermost flange 39 and a bar 40 has a center opening for receiving the rudder rod 37 and the bar contacts the top of the bearing. FIG. 3 shows the cables 31 and 32 crossing each other after leaving the guides 35 and 36 and the ends of the cables are connected to the ends of the bar 40. A set screw 41 can lock the bar 40 to the rudder rod 37 and the lower end of the rod 37 carries a rudder M so that a steering of the handlebars C will swing the rudder in a direction that will cause the vehicle A, when supported on a body of water by the pontoons G and H, to turn in the desired direction.

Above the bar 40 on the rudder rod 37, I mount a collar 42 that receives the rudder rod, see FIG. 1. A set screw 43 is used for securing the collar 42 to the rudder rod 37. A cap 44 is mounted at the top of the rudder rod 37. I have disclosed one particular means for connecting the rudder rod to the vehicle A and this particular mounting could be altered. When the vehicle is to be used on the water, the rudder rod 37 and rudder M are in their lowered and operative position, see FIG. 1. A swinging of the handlebars C in a clockwise direction in FIG. 3 will swing the rudder M in a counterclockwise direction because of the crossed cables 31 and 32 and this will steer the vehicle to the right.

FIG. 2 illustrates the changed positions of certain of the steering mechanism parts when the vehicle is to be used on land. Both of the set screws 41 and 43 for the bar 40 and the collar 42, respectively, are loosened and the rudder rod 37 is raised with respect to the vehicle for moving the rudder M above the ground. The rudder rod 37 is also rotated 180° for causing the rudder M to extend in a forward direction, as in FIG. 2, rather than in a rearward direction, as in FIG. 1. The bar 40 will still contact with the top of the bearing 38, but a steering of the handlebars C will merely cause the bar 40 to swing on the rudder rod 37 without rotating it. The collar 42 is lowered on the rudder rod 37, as is shown in FIG. 2, and will contact with the top of the steering bar 40. The set screw 43 can be tightened for securing the collar 42 to the rudder rod 37 in its new position and it will hold the rod 37 in its raised position where the rudder will not interfere with the vehicle being used on land. It is possible to remove the rudder rod 37 and rudder M entirely from the vehicle A while the vehicle is used on land.

The elongated tubular members 15 can be fastened to the sides of the vehicle when the vehicle is used on land and I provide brackets 44 on each side of the vehicle into which the tubular members 15 may be mounted when the pontoons are not being used.

The blank L for the link shown in FIG. 8 has a pair of openings 28' that receive the two cables 28—28 that interconnect the links to form the water paddle. FIG. 9 illustrates the blank L folded so as to form the water paddle that can be attached to the rear drive wheel of the vehicle. In FIG. 8, I show the transverse edge 23 of the blank L spaced from the adjacent end of the oval opening 20 to provide a water paddle area. The blank has a pair of parallel edges 50 that are spaced from the adjacent sides of the oval opening 20 and the portions of the blank lying between the edges 50 and the opening 20 constitute sides for the link after the blank has been folded along the lines 21 and 26 to form these sides. The tongue 24 of the completely folded blank will contact with the tire as shown in FIG. 10 and the sides of the link will grip the sides of the tire.

I claim:
1. An amphibious motor bike including:
   a. a collapsible pontoon removably mounted on each side of the bike, each pontoon comprising:
   b. a plurality of top flat rigid members arranged in a linear direction and extending from end to end of the pontoon, the opposed edges of adjacent flat members being spaced a slight distance apart;
   c. an inflatable member extending from end to end of the linearly aligned members and being secured to the undersurfaces of said members so as to act as hinges between adjacent flat members for permitting the flat members to be folded into parallel arrangement with respect to each other when the inflatable member is deflated; and
   d. means for removably securing said pontoons to the sides of the motor bike for supporting the bike on a body of water when the inflatable member is inflated.

2. The combination as set forth in claim 1: and in which
   a. said pontoon securing means including:
   b. a first pair of elongated tubular members, non-circular in cross section, one tubular member being secured to each side of the motor bike and extending lengthwise thereof;
   c. a pair of U-shaped members, non-circular in cross section, for each elongated tubular member; one leg of each U-shaped member being removably mounted in each end of said elongated tubular member so that each elongated tubular member will support a pair of U-shaped members with the free leg of each pair extending toward the free leg of its associate U-shaped member;
   d. a sleeve, non-circular in cross section mounted on the rigid member disposed at each end of each pontoon, said sleeves removably receiving the free legs of said U-shaped members with the ends of the free legs projecting beyond said sleeves; and e. a second pair of elongated tubular members, each one overlying the flat rigid members of one of said pontoons and having its ends receiving the ends of the free legs that extend beyond said sleeves;

f. whereby the non-circular cross sections of the first pair of elongated tubular members and the two pairs of U-shaped members will rigidly hold said U-shaped members against any relative movement with respect to said first pair of elongated tubular members and said second pair of elongated tubular members will add greater rigidity to the flat rigid pontoon members over which the second pair of elongated tubular members extend.

3. The combination as set forth in claim 2: and in which a. said motor bike has a pontoon carrier disposed on each side of the bike and each one adapted to hold one of the pontoons when the inflatable member has been deflated and when the flat rigid members of the pontoon have been folded into parallel arrangement with respect to each other.

4. An amphibious motor bike including a rear drive wheel and tire for the bike;

a. a water paddle removably mounted on the tire of said drive wheel and comprising:

b. a plurality of links hingedly connected together to form a row of links that can encircle the tire so that each link is substantially the same distance from the center of the wheel;

c. each link having a pair of side members designed to grip the sides of the tire; and d. each link having an outwardly and radially extending paddle portion that will extend transversely across the tire, the end links of the water paddle being removably connected together;

e. whereby a rotation of said drive wheel will rotate said water paddle therewith.

5. The combination as set forth in claim 4: and in which a. each link is made from a single blank that has an oval opening and a transverse edge spaced from one end of the oval opening to provide a water paddle area, the opposite end of the blank being formed into a tongue portion;

b. said blank also having parallel edges that are spaced from the sides of the oval opening, the blank being folded along transverse lines to provide the link with side members that can grip the sides of a tire, the tongue being bent on a transverse fold line and having its outer edge secured to said water paddle area at a spaced distance from said transverse edge; and c. a pair of cables secured to the undersurfaces of the tongues for the adjacent links, said cables extending through openings in the water paddle area of each link.

* * * * *